(12) United States Patent
Jayakumar

(10) Patent No.: US 10,719,598 B2
(45) Date of Patent: Jul. 21, 2020

(54) SYSTEMS AND METHODS FOR PROVIDING ENHANCED SECURITY BY FACILITATING PIN AND PATTERN BASED SECURE CODES

(71) Applicant: XEROX CORPORATION, Norwalk, CT (US)

(72) Inventor: Purushothaman Jayakumar, Chennai (IN)

(73) Assignee: Xerox Corporation, Norwalk, CT (US)

(*) Notice: Subject to any disclaimer, the term of this patent is extended or adjusted under 35 U.S.C. 154(b) by 180 days.

(21) Appl. No.: 15/795,315

(22) Filed: Oct. 27, 2017

(65) Prior Publication Data
US 2019/0130091 A1    May 2, 2019

(51) Int. Cl.
G06F 21/00    (2013.01)
G06F 21/36    (2013.01)
G06F 3/041    (2006.01)
G06F 21/83    (2013.01)

(52) U.S. Cl.
CPC ............ G06F 21/36 (2013.01); G06F 3/0412 (2013.01); G06F 21/83 (2013.01)

(58) Field of Classification Search
CPC ......... G06F 21/36; G06F 21/83; G06F 3/0412
USPC ....................................................... 726/19
See application file for complete search history.

(56) References Cited

U.S. PATENT DOCUMENTS

| | | | | |
|---|---|---|---|---|
| 2002/0109677 A1* | 8/2002 | Taylor | ............... | G06F 3/0233 345/173 |
| 2003/0110402 A1* | 6/2003 | Park | ............... | G06F 3/0233 726/18 |
| 2005/0160297 A1* | 7/2005 | Ogawa | ............... | G06F 21/31 726/19 |
| 2007/0011738 A1* | 1/2007 | Doss | ............... | G06F 21/36 726/18 |
| 2007/0016795 A1* | 1/2007 | Asano | ............... | G06Q 20/4014 713/182 |
| 2008/0148393 A1* | 6/2008 | Wendt | ............... | G06F 21/32 726/19 |

(Continued)

OTHER PUBLICATIONS

Guerar, Meriem, Alessio Merlo, and Mauro Migliardi. "ClickPattern: A Pattern Lock System Resilient to Smudge and Side-channel Attacks." JoWUA 8.2 (Jun. 2017): 64-78. (Year: 2017).*

(Continued)

*Primary Examiner* — Syed A Zaidi
(74) *Attorney, Agent, or Firm* — Jones Robb, PLLC

(57) ABSTRACT

The present disclosure discloses methods and systems for providing enhanced level of security for devices and/or applications on the devices. The method includes receiving a request from a user for setting a secure code as PIN with pattern option for accessing a device, for example. Then, a touch based keypad having a series of dots is displayed, each dot is associated with a pre-defined number. The secure code as input by the user is received, wherein the secure code is a combination of PIN and pattern. Then, the secure code is stored in the form of numbers along with pattern for the user. Thereafter, a request for accessing the device is received. The user is prompted to input a secure code. The secure code input by the user is matched with the stored secure code. Based on the matching, the user is allowed to access the device.

15 Claims, 5 Drawing Sheets

(56) References Cited

U.S. PATENT DOCUMENTS

| | | | |
|---|---|---|---|
| 2012/0254853 A1* | 10/2012 | Aggarwal | G06F 9/44505 717/173 |
| 2015/0074615 A1* | 3/2015 | Han | G06K 9/00033 715/863 |
| 2015/0089634 A1* | 3/2015 | DeLuca | G06F 3/0488 726/19 |
| 2016/0050209 A1* | 2/2016 | Govande | H04L 63/101 726/7 |

OTHER PUBLICATIONS

NPL Search Results (Year: 2020).*

* cited by examiner

SYSTEMS AND METHODS FOR PROVIDING ENHANCED SECURITY BY FACILITATING PIN AND PATTERN BASED SECURE CODES

TECHNICAL FIELD

The present disclosure discloses methods and systems for providing enhanced security by facilitating PIN and pattern based secure codes.

BACKGROUND

Business devices such as printers provide a secure print job feature to ensure print jobs are not accessible by unauthorized users. And, a traditional way of making a print job secure involves the user inputting a PIN (personal identification number) associated with the submitted print job. The PIN triggers/retrieves secure print jobs. The concern with PIN based security is that an unauthorized user tries and acquires the PIN, for example, by hit and trial or by heuristic methods to attain the secure print job illegitimately.

Other than PIN based security, pattern based security options are available in the market. The pattern locking is available in mobile devices. In pattern based security, the user traverses an onscreen 3×3 grid of contact points. However, there are a few limitations associated with this approach. The pattern based locking does not accept single stroke, i.e., any stroke follows a path. Further, a contact point can only be used once. Also, intermediate point between two points should also be a contact point. Moreover, there are a total nine points to choose from. As one contact point cannot be chosen twice, therefore, the maximum possible combination is 9*8*7*6*5=15,120.

Therefore, there is a need for efficient methods and systems for providing enhanced security.

SUMMARY

According to aspects illustrated herein, a method for providing enhanced level of security for devices is disclosed. The method includes receiving a request from a user for setting a secure code as PIN with pattern option for accessing a device. Then, a touch based keypad having a series of dots is displayed, each dot is associated with a pre-defined number. The secure code as input by the user is received, wherein the secure code is a combination of PIN and pattern. Then, the secure code is stored in the form of numbers along with pattern for the user. Thereafter, a request for accessing the device is received. The user is prompted to input a secure code. The secure code input by the user is matched with the stored secure code. Based on the matching, the user is allowed to access the device.

According to further aspects illustrated herein, a touch based keypad for providing enhanced security to users is disclosed. The touch based keypad includes: a plurality of dots, wherein each dot is associated with a pre-defined number, wherein touching a dot defines a PIN and dragging from one dot to one or more other dots defines a pattern, wherein the combination of PIN and pattern is a secure code.

According to additional aspects, a device is disclosed. The device includes a user interface having a touch based keypad, the touch based keypad having a plurality of contact points, wherein each contact point is associated with a pre-defined number, wherein touching a contact point represents a PIN and dragging from one contact point to one or more other contact points represents a pattern. The device further includes a controller configured for: receiving a request from a user for accessing the device; receiving a secure code from the user, wherein the secure code is a combination of PIN and pattern; matching the PIN and pattern as input by the user with PIN and pattern as stored; and allowing the user to access the device based on the matching. The device includes a memory configured for: storing the secure code as numbers along with pattern for the user.

According to furthermore embodiments, a method is disclosed. The method includes receiving a request from a user for accessing at least one of: a device and an application on the device. Then, the user is prompted to input a secure code. A touch based keypad is displayed to input the secure code, wherein the touch based keypad allows the user to input PIN and pattern based secure code. The secure code is received using the touch based keypad. Then, the secure code input by the user is matched with a secure code stored in a memory. The matching includes: checking whether the secure code input by the user includes PIN and pattern; based on the check, matching whether the PIN and the pattern as input by the user matches with the stored secure code; and allowing access when both the PIN and the pattern matches with the stored secure code in the same sequence.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1A:
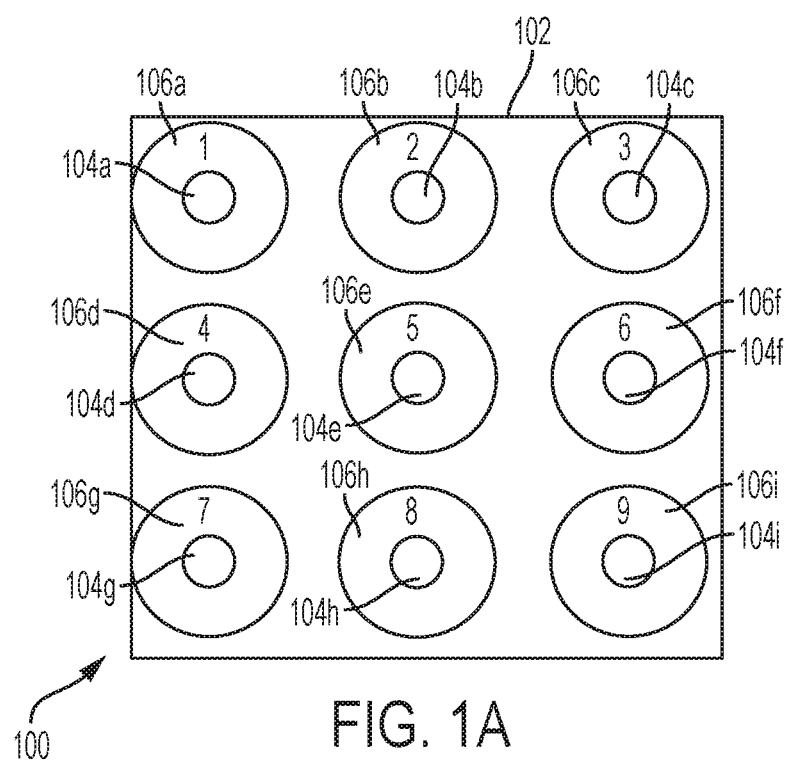
FIGS. 1A and 1B illustrate an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "device" refers to any electronic device having a touch based keypad such as a multi-function device, a mobile device, a laptop, a personal digital assistant (PDA), a computing device or any equivalent touch based device.

For the sake of simplicity, the disclosure may be discussed with multi-function device as an example, however, the disclosure is applicable for all devices. In the context of the current disclosure, the device includes a touch based keypad including a plurality of contact points (a series of dots for example), wherein each contact point is associated with a pre-defined number. The keypad facilitates PIN and pattern based secure code providing enhanced level of security.

The term "multi-function device" refers to a device or a combination of multiple devices configured to perform one or more functions, but not limited to, scanning, printing, copying, imaging, and so forth. The multi-function device includes software, hardware, firmware, or combination thereof. In context of the current disclosure, the multi-function devices offers secure access to the multi-function device or its service. To the end, the multi-function device enables a user to have PIN and pattern based secure codes in a particular sequence.

The term "user interface" is defined to include an interface shown on the multi-function device and is operable by the user to perform one or more functions such as change setting, check status, initiate scan, print, fax, print, copy, or any other functions. The user interface is a touch based interface. In the context of the current disclosure, the user interface provides a PIN and pattern based keypad. The user interface acts as input as well as output for the user. The user interface may broadly include a display, keypad, local user interface (LUI), driver user interface or a combination thereof.

The "touch based keypad" in the context of current disclosure includes a series of dots, where each dot is associated with a pre-defined number. The keypad allows the user to input a PIN and a pattern, wherein touching a dot is considered as a PIN and touching and dragging from one dot to one or more other dots is considered as a pattern. Touch may be a simple touch or a long touch. The simple touch and the long touch may be differentiated by the amount of time. Simple touch refers to a tap, while the long touch refers to touch and holding a finger for a pre-defined interval of time such as 2 seconds, 5 seconds ,etc.

The term "secure code" refers to a code used for accessing the devices such as multi-function device or its services. For example, the secure code may be needed for releasing the secure print jobs. In the context of the current disclosure, the secure code is a combination of PIN and pattern. The secure code may interchangbly be used with the phrase password. The secure code may include be of any length.

A "computing device" refers to any device that the user typically uses for performing his daily tasks such as a laptop, a desktop, a personal computer, a mobile phone, a tablet, a personal digital assistant (PDA) or a combination thereof.

Overview

Due to a number of limitations of PIN based password or pattern based password, the present disclosure provides methods and systems that overcome the associated limitations. The disclosure provides methods and systems that offer enhanced level of security by providing PIN and pattern based keypad. In particular, the present disclosure proposes a second security level to supplement a PIN by swiping a pattern on a PIN pad in addition to the PIN number, to make a more secure system. The PIN and pattern based keypad allows a user to set a password which is combination of both PIN and pattern in a particular sequence. The keypad is a touch based keypad and may be enabled in any devices. One such popular example is a printer. Other possible examples without any limitation are multi-function devices, scanners, fax machines, copiers, mobile phones, laptops, Personal Digital Assistants (PDAs), or any other devices incorporating touch based user interfaces/keypads. In this manner, security level is increased.

Exemplary Environment

FIG. 1A is an exemplary environment 100 in which various embodiments of the disclosure can be practiced. References to other figures such as FIG. 2, FIG. 3, or FIG. 4 may be made while discussing FIG. 1A. The environment 100 includes a keypad 102. The keypad 102 is a touch based keypad which is typically used for inputting passwords, PINs, secure codes, or the like. The keypad 102 is a part of touch based user interface, which in turn is a part of any electronic device. Various examples of such devices include but not limited to, multi-function devices, scanners, fax machines, copiers, mobile phones, laptops, Personal Digital Assistants (PDAs) or the like. Moreover, the keypad 102 may be a part of any device providing secure access to the device or its services or applications.

In the context of the current disclosure, the keypad 102 includes a series of contact points such as dots such as 104*a*, 104*b*, 104*c*, 104*d*, 104*e*, 104*f*, 104*g*, 104*h*, and 104*i*. The keypad 102 further includes a series of numbers such as 106*a*, 106*b*, 106*c*, 106*d*, 106*e*, 106*f*, 106*g*, 106*h*, and 106*i*. The dot 104*a* is associated with a pre-defined number 1 indicated by 106*a*. On similar lines, dot 104*b* is associated with a pre-defined number 2 indicated by 106*b*, dot 104*c* is associated with a pre-defined number 3 indicated by 106*c*, dot 104*d* is associated with a pre-defined number 4 indicated by 106*d*, dot 104*e* is associated with a pre-defined number 5 indicated by 106*e*, dot 104*f* is associated with a pre-defined number 6 indicated by 106*f*, dot 104*g* is associated with a pre-defined number 7 indicated by 106*g*, dot 104*h* is associated with a pre-defined number 8 indicated by 106*h* and dot 104*i* is associated with a pre-defined number 9 indicated by 106*i*.

Using the keypad 102, the user sets a secure code for accessing the device. The secure code is a combination of PIN and pattern. The PIN is input by simply touching one or more dots, while the pattern is drawn by touching and dragging from one dot to one or more other dots. For example, the user may touch the dots 104*i* and 104*f* and drag from dots 104*c* to dot 104*a*. Touching the dots 104*i* and 104*f* is considered as PIN and therefore corresponding numbers associated with the dots 104*i* and 104*f* represent PIN, i.e., 96. Dragging from dots 104*c* to 104*a* is considered as pattern, i.e., dragging from 3 to 1. At the time of storing, the numbers (321) are stored along with pattern in a particular sequence. For example, 96321 along with pattern is stored. In this manner, the user sets the secure code using the keypad 102. To access the device next time, the user inputs the same secure code, i.e., a combination of pattern and PIN in the same sequence. For example, the pattern first followed by the PIN or vice versa as set initially.

Figure 1B:
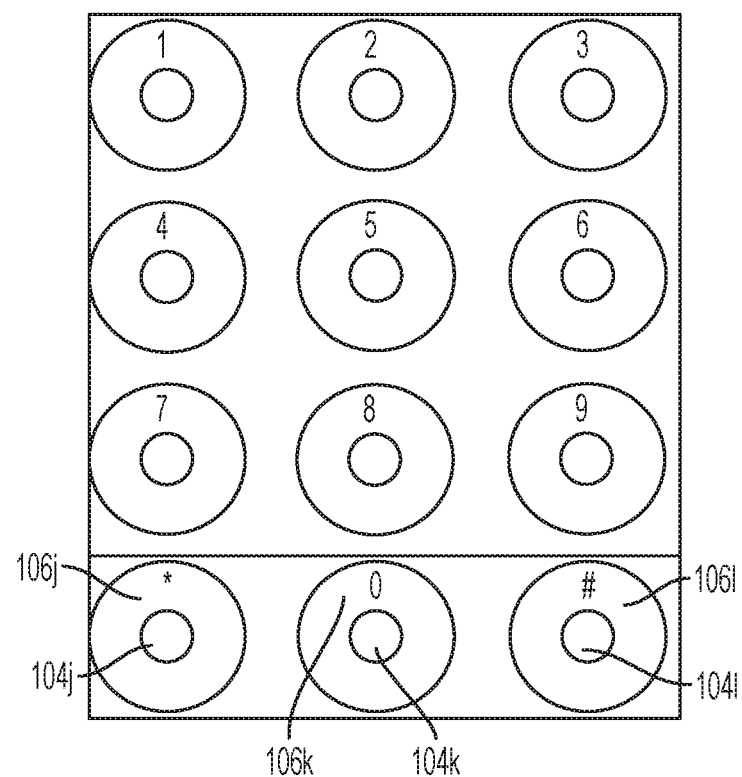

FIG. 1B shows another exemplary keypad 110. The keypad 110 is similar to the keypad 102 as shown in FIG. 1A. In addition, the keypad 110 includes additional set of dots and corresponding numbers associated with each dot. As shown, the keypad 110 includes dots such as 104*j*, 104*k*, and 104*l*. Each dot 104*j*, 104*k*, and 104*l* is associated with corresponding numbers or special characters. For example, the dot 104*j* is associated with a special character "*" marked as 106*j*, the dot 104*k* is associated with the number 0 as indicated by 106*k*, and the dot 104*l* is associated with a special character "#" indicated by 106*l*. The user can use any of these dots 104*j*, 104*k*, 104*l*, and corresponding numbers or special characters 106*j*, 106*k*, or 106*l* for setting a secure code for the multi-function device or equivalent devices.

The keypads 102 and 110 as shown in FIGS. 1A and 1B are just exemplary, there can be other variations to the contact points/dots and corresponding numbers. The shown keypads 102 and 110 are just for understanding purposes. To set a secure code, the user may set a secure code of 3 characters, where one number is for PIN (simple touch/long touch) or two dots to form a pattern. But other configurations are possible and depend on the type of device. For example, if the device is a printer, then the secure code may be of length 4-8 characters. The minimum length of the secure code (i.e., a combination of Pin and pattern) is of 4 characters, while the maximum length is 8 characters as an example. The configuration shown in FIGS. 1A and 1B are exemplary in nature and other implementations are possible in the present disclosure.

Exemplary System

Figure 2:
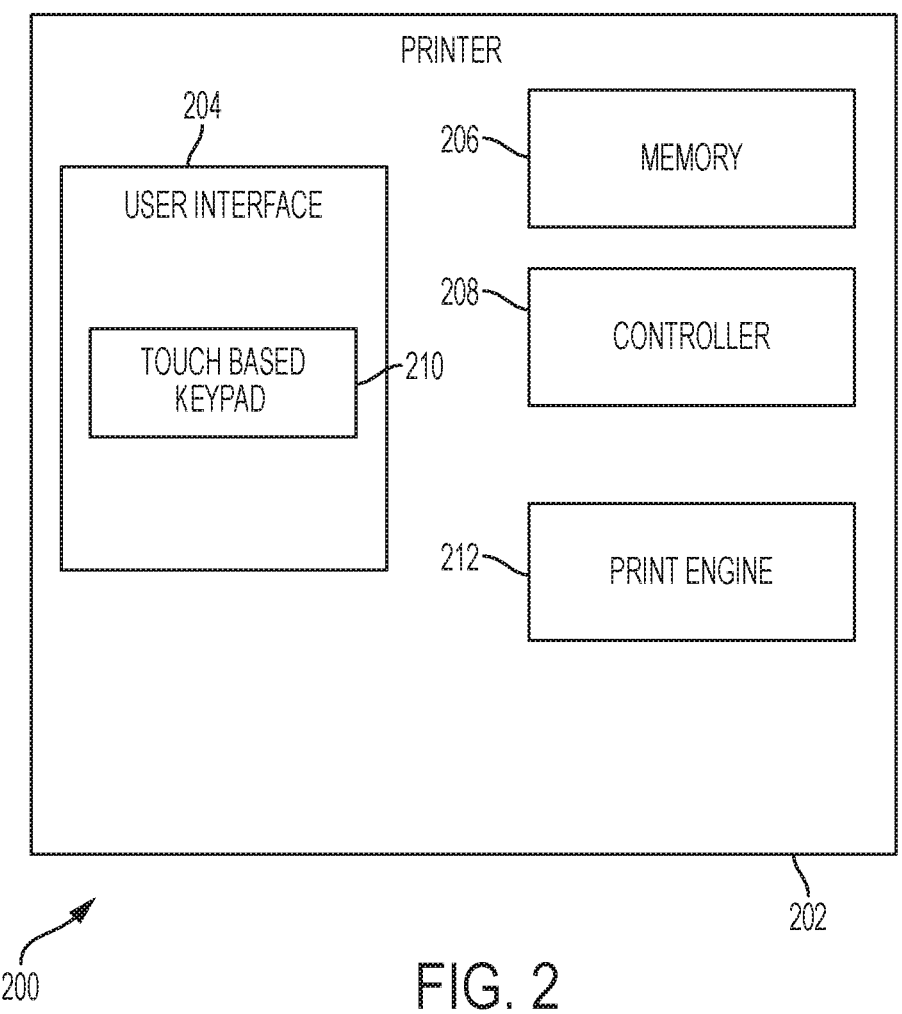
FIG. 2 is an overall system for providing enhanced security for accessing devices and/or applications on the devices.

FIG. 2 shows an overall system 200 facilitating enhanced security for a device such as a printer. Other examples of the device include a multi-function device, a scanner, a fax machine, a multi-function printer, a mobile device, a laptop, and a personal digital assistant (PDA). References to other figures such as FIGS. 1A and 1B, FIG. 3, or FIG. 4 can be made while discussing FIG. 2. As shown, the system 200 includes a printer 202. The printer 202 includes a user interface 204 which in turn includes a touch based keypad 210, a memory 206, a controller 208, and a print engine 212. Each of the components 204, 206, 208, 210, and 212 are coupled to each other via a communication bus or later developed protocols and also each of the components communicate with each other for providing enhanced level of security to access the printer 202. The printer 202 may include one or more additional components as required to implement the current disclosure.

As shown, the printer 202 is accessed by a user for print related functionality. The printer 202 receives one or more print requests from the user. The print request includes one or more documents for printing. To release the print job or to access the printer 202, the user provides a secure code.

The user interface 204 is accessed by the user to access the printer 202 for various purposes. For example, the user interface 204 may be used to change settings of the printer 202, set default preferences or the like. The user interface 204 is a touch based interface which can be accessed using finger, stylus, pen or a combination thereof. The user interface 204 further includes the touch based keypad 210 for setting the secure code and providing the secure code. The touch based keypad 210 includes a series of dots, each dot is associated with a pre-defined number as discussed above in FIGS. 1A and 1B in detail. Using the touch based keypad 210, the user sets the secure code as a combination of PIN and pattern in a particular sequence. The combination of the PIN and the pattern in the particular sequence adds a non-obvious layer and thus offer enhanced security to the printer 202.

As shown, the memory 206 stores the secure code for the user in a pre-defined format. The secure code is stored in the form of numbers along with pattern. For example, the PIN is stored in the form of numbers only, while the pattern is also stored in the form of numbers along with the pattern in the same sequence. The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes.

The controller 208 implements the current disclosure in two steps, 1) to initially allow the user to set the secure code, and 2) to allow access to the user based on the secure code as set initially.

At the time of setting the secure code, the controller 208 receives a request from the user for setting the secure code. The controller 208 then prompts the user to set the secure code which is a combination of PIN and pattern. The secure code is set using the touch based keypad 210. For example, the pattern is drawn by dragging from one dot to one or more other dots. While the PIN is set by simply touching one or more dots. In some cases, the dot may be touched for a specified time interval such as 10 seconds, 2 seconds, and so on. Touching the dots may be a simple touch or a long touch. The simple touch may be differentiated with the long touch by the amount of time. Here, the simple touch refers to just a tap, while the long touch refers to touch and hold for little longer.

In this manner, the controller 208 allows the user to set the secure code and enables the PIN with pattern option, i.e., a secure code option for the user. For example, the user may choose a secure code 12345, where 123 may be a pattern in the same sequence and 45 may be a PIN; or 1234 may be a pattern in the same sequence and 5 may be a PIN; 1234 may be a pattern in the same sequence and 5 may be time based PIN, and so on.

At the time of accessing the printer 202 next time, the controller 208 prompts the user to input a secure code for accessing the printer 202. The controller 208 is also configured for receiving a request for accessing an application on the printer 202 or its services. The controller 208 checks for the secure code input by the user with secure code as stored in the memory 206. Based on the matching, the user is allowed to access the printer 202, or its services. The matching includes matching the PIN and pattern both with PIN and pattern as stored in the memory 206. If both the PIN and the pattern input by the user matches with the PIN and pattern as stored, then the user is allowed to access the printing services. For example, the user is able to release print job based on the correct secure code in the same sequence.

Finally, the print engine 212 prints the document included in the print job. The print engine 212 is optional and is included when the device as mentioned above is a printer 202. In case the device is a mobile phone, PDA or similar device, then the disclosure may be implementing without the print engine 212.

For a person skilled in the art, it is understood that FIG. 2 is discussed with one print job as an example. But the printer 202 may receive more print jobs from the same user or from other users via their respective computing devices (although not shown).

Exemplary Flowchart

Figure 3:
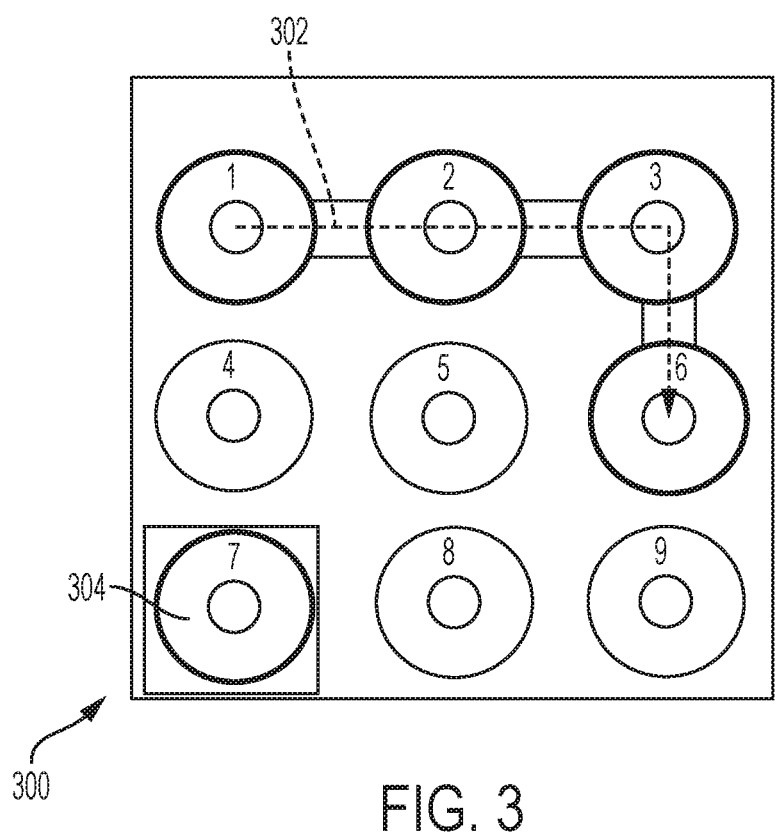
FIG. 3 is a snapshot indicating an exemplary PIN and pattern based password.
Figure 4:
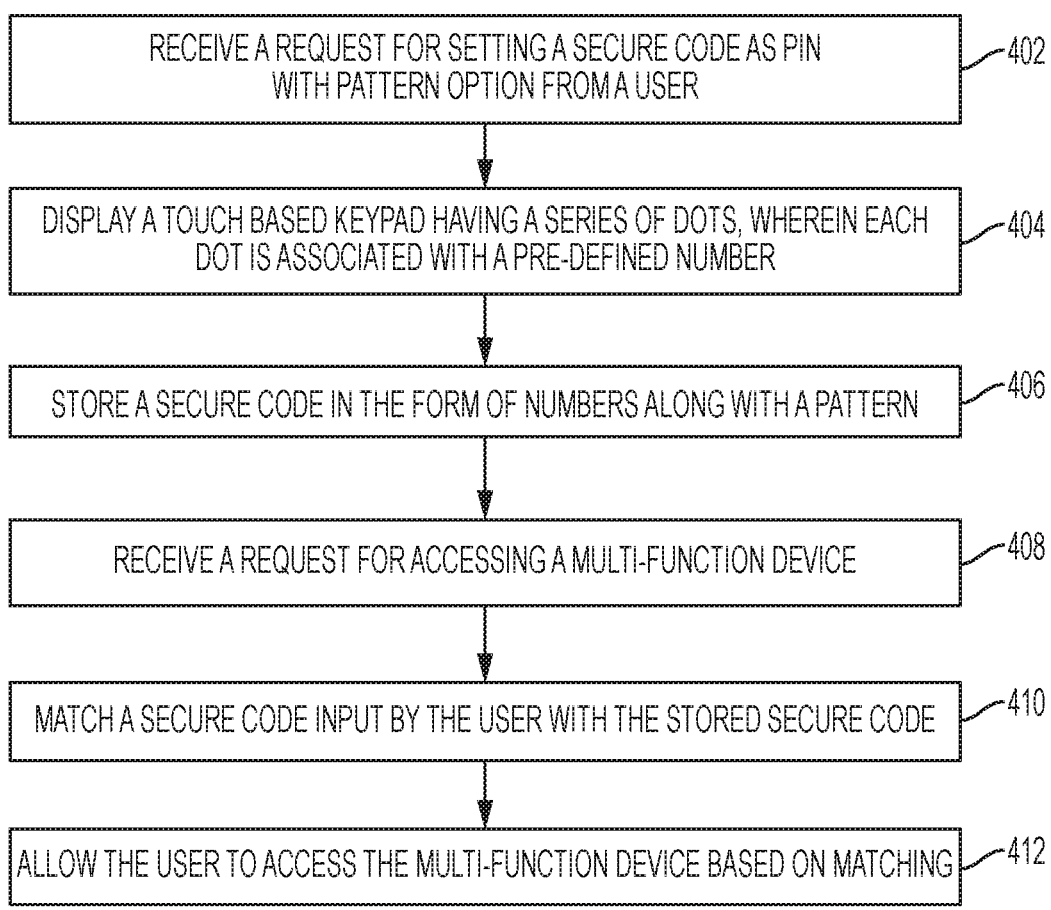
FIG. 4 is a method flowchart for providing enhanced security for accessing devices.

FIG. 4 is a method flowchart for providing enhanced level of security for devices. Various examples are but not limited to, a printer, a multi-function device, a scanner, a mobile phone, or the like. References to other figures such as FIGS. 1A and 1B, FIG. 2, or FIG. 3 can be made while discussing FIG. 4. For simplicity, FIG. 4 will be discussed considering a multi-function device as one example without limiting the scope of disclosure.

Initially, the method starts when a user wishes to set a secure code for accessing a multi-function device. The secure code is a combination of PIN and pattern, where PIN includes at least one number, while the pattern includes dragging from a dot to one or more other dots. The secure code may be required for accessing the multi-function device or accessing any application running on the device. For example, the secure code may be required to release any print jobs as submitted by the user. If the device is a mobile phone, the secure code may be required to access the mobile phone, i.e., to unlock the device or any application on the mobile phone.

At 402, a request for setting a secure code as PIN with pattern option is received from the user. The user is prompted to input the secure. Then at 404, a touch based keypad is displayed. The touch based keypad includes a series of dots, each dot is associated with a pre-defined number. The user sets the secure code as a combination of PIN and pattern. One such example is shown in FIG. 3, where a keypad 300 is shown. Using the keypad 300, the user sets the secure code by dragging dots imposed with numbers 1234 (i.e., a pattern indicated by 302) and touching a dot imposed with number 7 (i.e., a PIN indicated by 304). In this manner, the secure code is set by the user using the keypad 300. Then, at 406, the secure code is stored in the form of numbers along with pattern for the user. Here, the PIN is stored in the form of number such as 7, while the pattern is stored in the form of numbers, i.e., 1234 along with the pattern, i.e., in the same sequence starting from 1 to 2 to 3 to 4. For all subsequent use by the user, PIN with pattern option is enabled for the user and the user is required to input the set secure code for accessing the multi-function device.

At 408, a request is received from the user for accessing the multi-function device next time. In some embodiments, the request is received for accessing one or more applications on the device. The user is prompted to input a secure code before allowing access to the multi-function device. To input the secure code, the touch based keypad is displayed enabling the user to input the secure code. The secure code is received using the touch based keypad. At 410, the secure code input by the user is matched with the secure code as stored initially. To this end, it is checked whether the secure code input by the user includes PIN with pattern (PIN and pattern). If the condition is true, the method proceed further else the method stops. For example, if it is found the secure code input by the user does not include PIN with pattern (i.e., only includes PIN or pattern), the method stops. But if it is found that the secure code input by the user includes PIN with pattern, the method proceeds. It is then checked whether the PIN and pattern input by the user matches with both the PIN and pattern as stored with the multi-function device. It is additionally checked whether the PIN and pattern are input in the same sequence as stored with the multi-function device. When either PIN or pattern is not matching, an error is prompted to the user.

Based on the multiple checks/matching, at 412, the user is allowed to access the multi-function device. The access is allowed when both the PIN and the pattern matches with the stored secure code in the same sequence. In this manner, the use is allowed to access the device.

The present disclosure provides methods and systems providing enhanced security for accessing one or more devices such as touch based devices. For example, the methods and systems enable a user to use both PIN and pattern combination for secure codes, thereby offering a high level of security. As the secure code is a combination of PIN and pattern in a particular sequence, it becomes difficult for an intruder to make more guesses as well as combination, which makes it safer and more secure. In addition, no hardware changes are needed to implement the disclosure, while minimal changes in drivers of the device (i.e., drivers which are used to set the secure code) are required to facilitate the high level of security. The method and systems focus on adding a second security level to supplement a PIN by swiping a pattern on a touch based key pad in addition to the PIN number, to make a more secure system. In addition, supplementing the PIN by swiping patterns add another non-obvious layer of a pattern secure code.

For a person skilled in the art, it is understood that the use of phrase(s) "is," "are," "may," "can," "could," "will," "should," or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "checking," or "matching," or "displaying," or "storing," or "prompting," or "receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for providing an enhanced level of security for a device, the method comprising:
receiving a request from a user for setting a secure code as PIN with pattern for accessing said device;
displaying a touch-based keypad having a series of dots, each dot being associated with a pre-defined number;
receiving the secure code as input by the user, wherein the secure code is a combination of PIN and pattern in a particular sequence, and wherein receiving the secure code comprises receiving touch on one or more dots that defines the PIN of the secure code, wherein the PIN comprises at least one number associated with a time interval, and contemporaneously receiving a drag from one dot to one or more other dots that defines the pattern of the secure code;
storing the secure code in the form of numbers along with said pattern for the user;
receiving a request for accessing the device;
prompting the user to input a secure code;
matching the secure code input by the user with the stored secure code; and
allowing the user to access the device based on the matching.

2. The method of claim 1, wherein the device comprises a touch-based device.

3. The method of claim 1, further comprising enabling the PIN with pattern for the user.

4. The method of claim 1, further comprising determining whether the secure code input by the user includes PIN with pattern.

5. The method of claim 4, further comprising checking both the PIN and the pattern with the secure code as stored.

6. The method of claim 4, further comprising allowing access when both the PIN and the pattern matches with the PIN and the pattern of the stored secure code in the same sequence.

7. A device, comprising:
a touch-based keypad for providing enhanced security to users, the touch-based keypad comprising a plurality of dots, wherein each dot is associated with a pre-defined number, and wherein touching a dot defines a PIN and dragging from one dot to one or more other dots defines a pattern; and a controller configured for receiving a secure code using the touch-based keypad;

matching the secure code input by the user with a secure code stored in a memory, wherein the secure code stored in the memory is a combination of PIN and pattern in a particular sequence, wherein the PIN of the stored secure code is defined by touching one or more dots and comprises at least one number associated with a time interval, and wherein the pattern of the stored secure code is defined by a contemporaneous drag from one dot to one or more other dots, and wherein matching comprises checking whether the secure code input by the user includes PIN and pattern, based on the checking, determining whether the PIN and the pattern as input by the user matches with the PIN and pattern of the stored secure code, and allowing access when both the PIN and the pattern matches with the PIN and pattern of the stored secure code in the same sequence.

8. A device, comprising:

a user interface comprising a touch-based keypad, the touch-based keypad having a plurality of contact points, wherein each contact point is associated with a pre-defined number, wherein touching at least one contact point is a PIN comprising at least one number associated with a time interval and contemporaneously dragging from one contact point to one or more others contact points is a pattern;

a controller configured for receiving a request from a user for accessing the device, receiving a secure code from the user, wherein the secure code is a combination of PIN and pattern in a particular sequence, and wherein receiving the secure code comprises receiving touch on one or more contact points that defines the PIN of the secure code, and receiving a drag from one contact point to one or more other contact points that defines the pattern of the secure code, matching the PIN and pattern as input by the user with PIN and pattern as stored, and allowing the user to access the device based on the matching; and a memory configured for storing the secure code as numbers along with pattern for the user.

9. The device of claim 8, wherein the device comprises a multi-function device, a scanner, a printer, a fax machine, a multi-function printer, a mobile device, a laptop, or a personal digital assistant (PDA).

10. The device of claim 8, wherein the controller is configured for enabling the PIN with pattern for the user.

11. The device of claim 8, wherein the controller is configured for determining whether the secure code entered by the user includes PIN and pattern.

12. The device of claim 11, wherein the controller is configured for checking whether both the PIN and pattern matches with PIN and pattern as stored.

13. The device of claim 11, wherein the controller is configured for allowing access to the device when both the PIN and pattern matches with the stored PIN and pattern code in the same sequence.

14. The device of claim 8, wherein the controller is configured for receiving a request for accessing an application on the device.

15. A method comprising:

receiving a request from a user for accessing at least one of: a device and an application on the device;

prompting the user to input a secure code;

displaying a touch-based keypad to input the secure code, wherein the touch-based keypad allows the user to input PIN and pattern-based secure code, and wherein the touch-based keypad includes a series of dots, each dot being associated with a predefined number;

receiving the secure code using the touch-based keypad;

matching the secure code input by the user with a secure code stored in a memory, wherein the secure code stored in the memory is a combination of PIN comprising at least one number associated with a time interval and pattern in a particular sequence, wherein the PIN of the stored secure code is defined by touch on one or more dots, and wherein the pattern of the stored secure code is defined by a contemporaneous drag from one dot to one or more other dots, and wherein matching comprises:

checking whether the secure code input by the user includes PIN and pattern;

based on the check, determining whether the PIN and the pattern as input by the user matches with the PIN and pattern of the stored secure code; and allowing access when both the PIN and the pattern matches with the PIN and pattern of the stored secure code in the same sequence.

* * * * *